US010795895B1

(12) United States Patent
Taig et al.

(10) Patent No.: US 10,795,895 B1
(45) Date of Patent: Oct. 6, 2020

(54) BUSINESS DATA LAKE SEARCH ENGINE

(71) Applicant: EMC IP Holding Company LLC, Hopkinton, MA (US)

(72) Inventors: Ran Taig, Beer Sheva (IL); Avitan Gefen, Lehavim (IL); Omer Sagi, Mazkeret Batya (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 319 days.

(21) Appl. No.: 15/794,387

(22) Filed: Oct. 26, 2017

(51) Int. Cl.
*G06F 16/00* (2019.01)
*G06F 16/2457* (2019.01)
*G06F 16/14* (2019.01)
*G06F 16/335* (2019.01)
*G06F 16/901* (2019.01)

(52) U.S. Cl.
CPC ...... *G06F 16/24578* (2019.01); *G06F 16/144* (2019.01); *G06F 16/335* (2019.01); *G06F 16/9024* (2019.01)

(58) Field of Classification Search
CPC ............. G06F 16/24578; G06F 16/144; G06F 16/335; G06F 16/9024
See application file for complete search history.

(56) References Cited

U.S. PATENT DOCUMENTS 7,792,830 B2 * 9/2010 Carmel ................. G06F 16/334 707/728
10,339,179 B2 * 7/2019 Yousfi ..................... G06F 16/25
2005/0015381 A1 * 1/2005 Clifford ................ G06F 16/282
2012/0016877 A1 * 1/2012 Vadrevu .................. G06F 16/35 707/737
2013/0238621 A1 * 9/2013 Ganjam .............. G06F 16/2465 707/737
2016/0378765 A1 * 12/2016 Bernstein ............ G06F 16/9024 707/748
2018/0144314 A1 * 5/2018 Miller .................... G06Q 20/14
2018/0173755 A1 * 6/2018 Xia .................. G06F 16/24537

* cited by examiner

*Primary Examiner* — Tarek Chbouki
(74) *Attorney, Agent, or Firm* — Ryan, Mason & Lewis, LLP

(57) ABSTRACT

Business Data Lake searching techniques are provided. A method comprises obtaining a graph representing tables of the Business Data Lake, where each node represents one table and edges between nodes represent foreign key connections; applying a node rank algorithm to determine a relevancy score of the tables based on a number of links to/from other tables; and, in response to a query: ranking a relevancy of query items based on a term frequency-based score to generate candidate results; extracting a candidate sub-graph based on the following: a top-L tables based on the term frequency-based score, and/or a top-M tables based on a topic model distance score for the given query and candidate items; enriching the extracted candidate sub-graph by adding new tables using an item-to-item collaborative filter where a similarity between two tables is measured based on a number of interactions; and ordering the tables in the enriched sub-graph based on the relevancy score and/or a user-to-item collaborative filter that evaluates past user interactions with prior results.

20 Claims, 5 Drawing Sheets

400

PREPROCESSOR

410 CONSTRUCT ASSET GRAPH 500 (FIG. 5)

420 RANK NODES IN ASSET GRAPH USING NODE RANK ALGORITHM 100
110
BDL
200
ENHANCED INDEXING ENGINE (FIG. 2)
400
PREPROCESSOR (FIG. 4)
135
ENHANCED SEARCH ENGINE (FIG. 3)
140
NLP BASED MODELS
150
TEXT BASED SEARCH TOOL
160
RESULTS ORDERING ENGINE
170
NODE RANK ORDERING
180
USER-ITEM COLLABORATIVE FILTERING
600
RESULTS ASSET GRAPH CONSTRUCTION (FIG. 6)
190
USER INTERFACE
120
USER QUERY
130

BUSINESS DATA LAKE SEARCH ENGINE

FIELD

The field relates generally to searching through a business data lake.

BACKGROUND

Business Data Lakes (BDL) consolidate the storage of multiple data sources for enterprises and empower the collaboration of data assets among organizational business units. BDLs typically incorporate a data governance layer that manages data access protocols and rules, while providing navigation within the BDL. The value of any BDL is highly dependent on the ability of users to find relevant assets across the BDL.

BDLs typically provide primitive textual search tools where user searches result in items that contain the same key words of a given query, without considering important aspects, such as semantic similarities, inter-relations among data assets, query history and user profiles.

A need therefore exists for improved search tools for searching through a business data lake.

SUMMARY

In one embodiment, a method is provided for searching through a Business Data Lake. An exemplary method comprises obtaining a directed graphical structure representing a plurality of tables of the Business Data Lake, where each node in the directed graphical structure represents one of the tables and edges between the nodes represent connections established by foreign keys in the tables; applying a node rank algorithm to the directed graphical structure to determine a relevancy score of the tables based on a number of links to or from other tables; in response to a query, performing the following steps: ranking a relevancy of one or more items in the query based on a term frequency-based score to generate candidate results; extracting a candidate sub-graph from the directed graphical structure based on one or more of the following: a top-L tables based on the term frequency-based score, and a top-M tables based on a topic model distance score for the given query and items in candidate results; enriching the extracted candidate sub-graph by adding one or more tables not previously in the extracted candidate sub-graph using an item-to-item collaborative filter where a similarity value between two tables is measured based on a number of interactions with the two tables by a plurality of users of the Business Data Lake that have interacted with the two tables; and ordering the tables in the enriched extracted candidate sub-graph based on one or more of the relevancy score generated by the node rank algorithm and a user-to-item collaborative filter that evaluates past interactions of the users with prior search results.

Other illustrative embodiments include, without limitation, apparatus, systems, methods and computer program products comprising processor-readable storage media.

DETAILED DESCRIPTION

Figure 1:
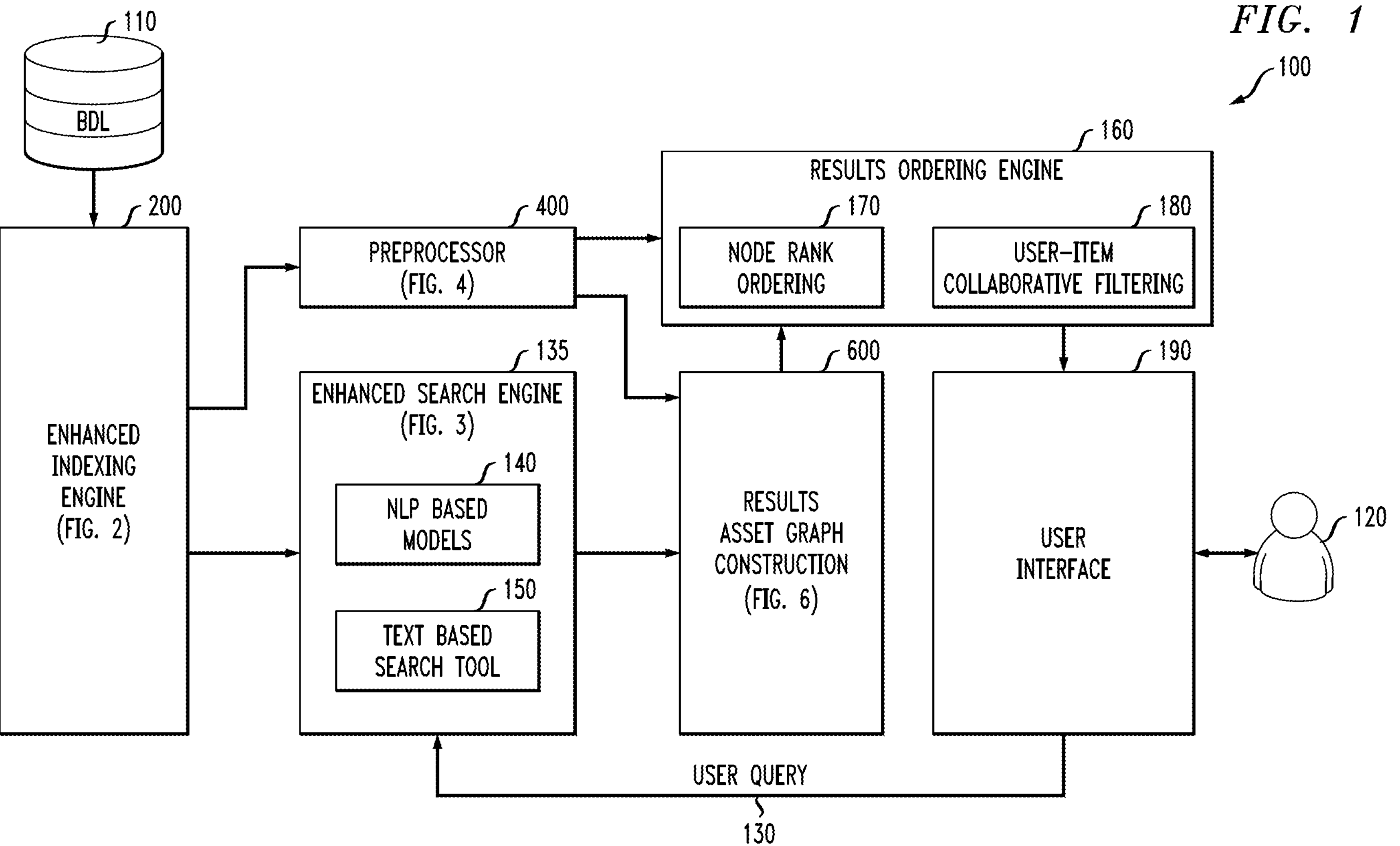
FIG. 1 is a block diagram of a business data lake search engine, according to an embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. Aspects of the disclosure provide methods and apparatus for searching through a business data lake.

In one or more embodiments, a search platform is provided that is tailored for the requirements of a BDL. In some embodiments, the existing indexing mechanism of BDL data assets is enriched with additional information derived from one or more of text-processing algorithms, past SQL (Search and Query Language) and search queries, and inter-relations among the data assets. The search results are then optionally presented to textual queries based on one or more of outputs of NLP (Natural Language Processing) models, collaborative filtering approaches and graph algorithms.

Business Data Lakes

As noted above, existing BDLs typically provide a primitive textual search tool where user searches result in items that contain the same key words of a given query, without considering important aspects, such as semantic similarities, inter-relations among data assets, query history and user profiles. The existing search tools do not allow metadata to be extracted from the BDL (such as relations between tables and columns). In addition, the searching involves a full string matching of any word in the query against all available words (e.g., table/column names or description). This approach raises several problems, as described.

A. Terminology Differences Across Business Functions Not Captured

While naming conventions may exist for naming data assets, the reality is that these rules are not consistently documented, followed or enforced. The existing naming conventions vary from one internal organization to another and in many cases, within different assets of the same internal organization. Thus, a user must have an intimate acquaintance with the asset in order to efficiently navigate and access the needed data. Though it may work when a limited group of individuals access the data, it significantly limits the ability of new or external users to find relevant assets.

One common phenomenon of terminology issues is abbreviation. If a user is not provided with a dictionary, he or she will end up searching for the original word and not its local abbreviation. In the existing approach, such queries will not get relevant results as there is no direct way to map the query text to the relevant abbreviations. For example, WINDOWS10 and Microsoft Operating System may be treated as different concepts with existing BDL search tools. Other common misleading terminologies are the use of local codes as names, typographical errors in names or in descriptions and arbitrary concatenated words.

B. Morphological Differences not Considered

As noted above, a simple textual search performs a full string matching of any word in the query against all available words (e.g., table/column names or description). For example, if the search query looks for "articles," the search will hit the description "articles type," but not "article type". The simple search does not consider all of the morphological forms (or other possibilities) a word can appear in, such as build/built, run/ran, color/colour. The problem becomes harder in order to catch synonyms as well, such as employee/worker, sale/purchase/transaction.

C. Textual Search Does Not Capture Data Assets Relations

In the current approach, there is no function that extracts any metadata from the BDL (e.g., relations among tables and columns). Therefore, while some tables might be strongly connected and highly relevant to the search query, they will not show up in the search results. For example, consider that table 2 has an information extension to some of the rows in table 1 and there is a foreign key that relates between the tables. If a search will return table 1 in the search result, the search will not consider the relevancy of table 2, unless the same search phrase fits both tables.

In the context of relational databases, a foreign key is one or more fields in a first table that uniquely identifies a row of another table or the same table.

D. User Querying History Not Captured

The existing search approach does not consider past interactions of users with the search engine when presenting new results. If multiple searches for 'Hybrid-cloud configuration' resulted in clicking on item X rather than on item Y, it is likely that item X should be presented in the results in future 'Hybrid cloud configuration' searches, and item Y should be omitted. The current approach relies upon textual similarity of queries to data assets textual properties and hence, lacks the capability of considering past interactions when recommending relevant items.

E. Textual Search Does Not Capture Similarities Among Users

The current approach does not leverage information regarding the interactions of similar users with the search results. For example: if a search for 'EMEA policies' is conducted by multiple users from a sales organization, and usually results in exploring item X, then item X should be prioritized whenever a sales person searches for 'EMEA policies,' even if textual terms of this query are not similar to those of item X. This concept is often referred to as a social assisted approach for search and recommendation engines.

F. Current Approach Cannot Hint for Data Assets Importance

One or more aspects recognize that a data asset can be regarded as "important" if the data asset is a hub of the database relations network (e.g., being related to many other assets and being approached by a relatively significant number of user queries (ETL, SQL, free text search)). This information can be highly valuable for the ranking of search results. The user looking for "client_id" will probably look for some central tables as the install base table or the main customer database rather than some local table with specific attributes that relate to the customer.

Business Data Lake Search Engine

FIG. 1 is a block diagram of a business data lake search engine 100, according to an embodiment of the disclosure. As shown in FIG. 1, the exemplary business data lake search engine 100 comprises a business data lake 110, and a user 120 who submits a user query 130 to a user interface 190.

The business data lake 110 is processed by an enhanced indexing engine 200, discussed further below in conjunction with FIG. 2, that performs improved indexing on the business data lake 110, as discussed below.

The indexing information generated by the enhanced indexing engine 200 is used by an enhanced search engine 135, discussed further below in conjunction with FIG. 3, and a preprocessor 400, discussed further below in conjunction with FIG. 4. The exemplary enhanced search engine 135 comprises NLP-based models 140 and a text base search tool 150, discussed further below in conjunction with FIG. 3.

A results asset graph construction process 600, discussed further below in conjunction with FIG. 6, processes the preliminary search results of the enhanced search engine 135, using the output of preprocessor 400, as discussed below. As shown in FIG. 1, a results ordering engine 160 processes the output of the preprocessor 400 and the results asset graph construction block process 600.

The results ordering engine 160 comprises a node rank algorithm ordering stage 170 and a user-item collaborative filtering stage 180, each discussed below.

Figure 2:
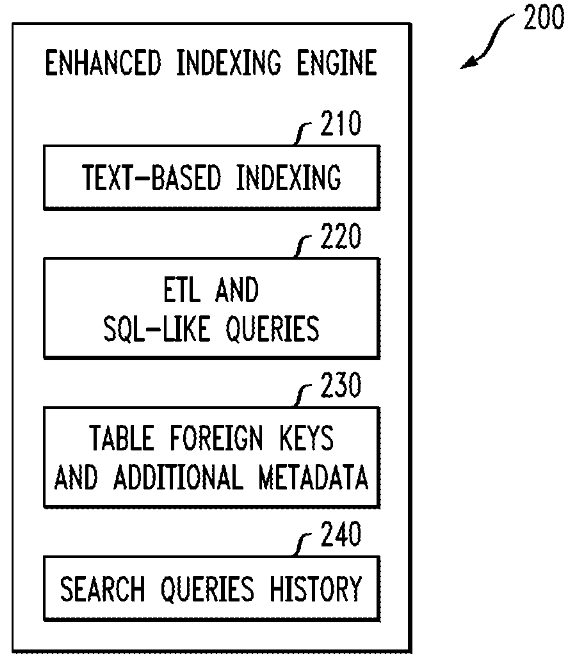
FIG. 2 is a block diagram of an exemplary enhanced indexing engine of FIG. 1, in further detail, according to an embodiment of the disclosure.

FIG. 2 is a block diagram of an exemplary enhanced indexing engine 200 of FIG. 1, in further detail, according to an embodiment of the disclosure. Generally, the exemplary enhanced indexing engine 200 serves as a data consolidation component. As shown in FIG. 2, the enhanced indexing engine 200 comprises a text-based indexing module 210, an ETL (Extract, Transform, Load) and SQL-like queries module 220, a table foreign keys and additional metadata module 230, and a search queries history module 240.

The text-based indexing module 210 corresponds to the existing indexing techniques for BDL searching, such as indexing asset names and descriptions. The ETL and SQL-like queries module 220 performs the indexing necessary for ETL and SQL-type queries, in a known manner.

The table foreign keys and additional metadata module 230 extracts the foreign keys and additional metadata that are used to model the inter-relations among data assets, as discussed further below. The search queries history module 240 indexes past user queries, whether direct search queries of unstructured data and queries originated in SQL client interaction with the structured part of the BDL (e.g., any Create, Read, Update, Delete query). This information is used for creating user and asset profiles for results personalization, and is also a hint for non-trivial interaction between assets (which cannot be extracted solely from names and descriptions), as discussed further below.

Figure 3:
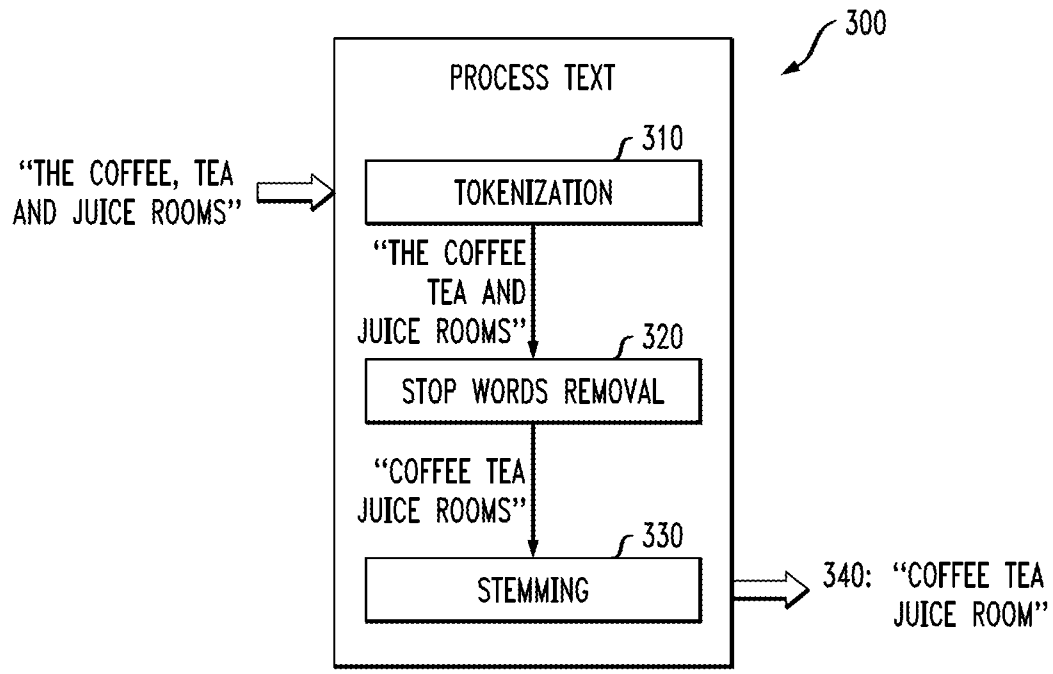
FIG. 3 is a flow chart illustrating an exemplary implementation of a text processing method performed by the enhanced search engine 135 of FIG. 1, according to one embodiment of the invention.

FIG. 3 is a flow chart illustrating an exemplary implementation of a text processing method 300 performed by the enhanced search engine 135 of FIG. 1, according to one embodiment of the invention. As noted above, the enhanced search engine 135 comprises NLP-based models 140 and a text base search tool 150. Generally, the enhanced search engine 135 enhances the existing text-based approach provided by the text base search tool 150 with an NLP-based approach provided by the NLP-based models 140 that look "behind the text" (e.g., understanding the user intent as much as possible, given NLP algorithms).

The exemplary NLP-based models 140 perform an initial candidates extraction that retrieves data assets that are most likely to be similar to a given query based on several NLP methods. NLP methods enable sophisticated matching of textual objects rather than a simple string matching as done in existing approach. In one or more embodiments, the present disclosure leverages a number of NLP methods towards finding data assets that might be relevant to a given query.

In the text processing method 300 of FIG. 3, a preprocessing pipeline is required before conducting common text related tasks. In this process 300, a sentence is converted into a 'bag of words' 340. During step 310, each text should be tokenized. Tokenization is the process in which words are split by spaces, punctuations or any other tokenization signs. After tokenization, stop-words are removed from the list of words during step 320, so that words such as 'the' or 'of' are not considered when conducting a text matching. Finally, during step 330, each word within the bag-of-words goes through a stemming component. Stemming is the process of converting words into their root form. For example, the words "argued," "argues," and "arguing" are reduced to the stern "argu". The text-based ranking methods describe herein use the processed bag-of-words 340 as their input.

The exemplary NLP-based models 140 rank query-items relevancy using an Okapi score. The Okapi score takes into account factors such as term frequency in a query or an item description, number of items that contain the term, and the length of the text. Given a new query, items are ranked according to their Okapi score with the query in hand, where each item is represented by a sparse vector of terms (in a TF-IDF format) in the given text. See, e.g., Stephen E. Robertson et al., "Okapi at TREC-3," Proc. of the Third Text Retrieval Conference (TREC 1994), (November 1994), incorporated by reference herein in its entirety.

The exemplary NLP-based models 140 employ NLP topic models for finding the latent subjects in a corpus of documents. The user of this method defines a number of topics [k] and the model finds those topics based on the word's distribution among the texts. The output of a topic model for a given text is a [k] dimensional vector, in which each dimension represents the probability that the given text includes the topic represented by the dimension. In the disclosed solution, the distance between some query to all candidate items is calculated using the Kullback-Leibler divergence (KLD). See, e.g., S. Kullback and R. A. Leibler, "On Information and Sufficiency," Annals of Mathematical Statistics. Vol. 22, No. 1, pages 79-86. (1951), incorporated by reference herein in its entirety.

Figure 4:
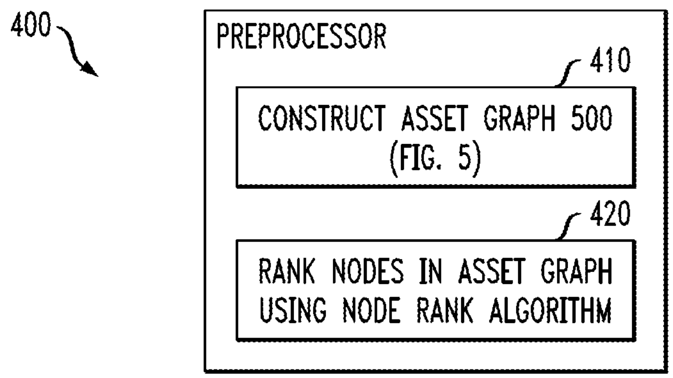
FIG. 4 is a flow diagram of the preprocessor of FIG. 1, in further detail, according to one embodiment of the disclosure.

FIG. 4 is a flow diagram of the preprocessor 400 of FIG. 1, in further detail, according to one embodiment of the disclosure. Generally, the preprocessor 400 prepares the infrastructure on which algorithms, in one or more embodiments, are eventually run to produce relevant, accurate and well-ordered list of results to the user.

As shown in FIG. 4, the exemplary preprocessor 400 initially constructs an asset graph 500, discussed further below in conjunction with FIG. 5, during step 410 and then ranks nodes in the asset graph 500 using a node rank algorithm, discussed below, during step 420. In one or more embodiments, the node rank algorithm is based on a Page Rank algorithm.

A Page Rank algorithm is a well-known algorithm that ranks web sites in search engine results, such as Google search engine results. The assumption behind the algorithm is that more important websites will be linked (shown as links) more often by other websites. Therefore, the Page Rank algorithm counts the number and quality of links to a web page to estimate the relative importance of the web site. Generally, a given page has a page rank based on the importance of pages that link to the given page.

One or more embodiments of the disclosure provide a node rank algorithm that is employed by the preprocessor 400 in step 420. As noted above, in one or more embodiments, the node rank algorithm is based on the Page Rank algorithm. The node rank algorithm needs, as input, a directed graphical structure. For that end, the exemplary preprocessor 400 generates a graphical structure of all the tables in the BDL 110 that are referred to as an Asset Graph.

Figure 5:
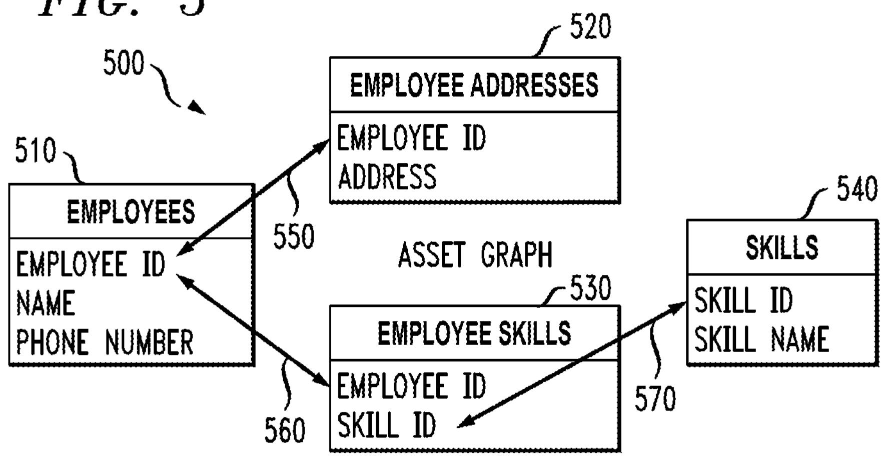
FIG. 5 illustrates an exemplary asset graph that is generated by the preprocessor of FIG. 4, according to one embodiment of the disclosure.

FIG. 5 illustrates an exemplary asset graph 500 that is generated by the preprocessor 400 of FIG. 4, according to one embodiment of the disclosure. As shown in FIG. 5, the exemplary asset graph 500 comprises a plurality of nodes 510, 520, 530, 540, where each node in the asset graph 500 represents a table from the BDL 110 and the bidirectional arcs 550, 560, 570 between the nodes will represent connections established by existing foreign keys. For example, as shown in FIG. 5, the foreign key "Employee ID" exists in (and links) three tables 510, 520, 530, and the foreign key "Skill ID" exists in (and links) two tables 530, 540.

In one or more embodiments, the disclosed node rank algorithm represents BDL tables in a similar manner as websites are used in the original page rank algorithm. The node rank algorithm is applied on the asset graph 500 during step 420. As in the original page rank algorithm, the assumption here is that more important (business-wise) tables will have more links to/from other tables. The result of running the node rank algorithm on the asset graph 500 will be an importance score, relative to the system, of each table 510, 520, 530, 540 in the BDL 110. In the example of FIG. 5, the Employees table 510 will be the most important, since it has the most links pointing at it.

Figure 6:
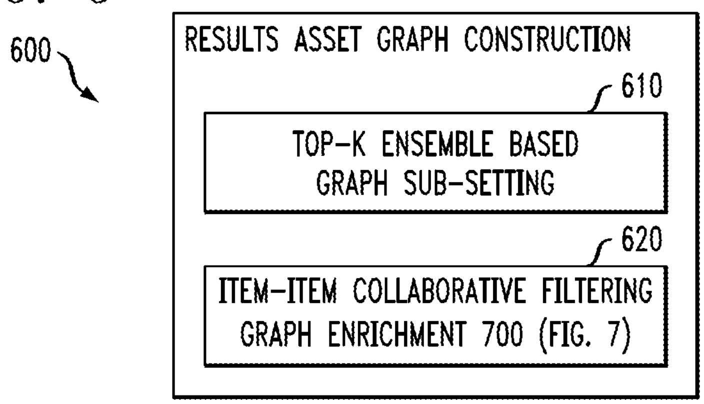
FIG. 6 is a flow chart illustrating an exemplary implementation of the results asset graph construction process of FIG. 1, according to an embodiment of the disclosure.

FIG. 6 is a flow chart illustrating an exemplary implementation of the results asset graph construction process 600 of FIG. 1, according to an embodiment of the disclosure. As noted above, the results asset graph construction block 600 processes the preliminary search results of the enhanced search engine 135, and uses them, as well the asset graph 500, created by preprocessor 400 to create a relevant set of results.

Generally, the results asset graph is a sub-graph of the asset graph 500. The graphical structure is important for the next steps. The results asset graph will take only the nodes (and, of course, corresponding edges) from the asset graph 500 that contain data assets that will be returned from the algorithms of the enhanced search engine 135, in the following manner:

Given user-defined parameters [$k_1$, $k_2$, $k_3$], the top-K data assets are extracted during step 610, as follows:

1. Top [$k_1$] data assets in terms of Okapi score;
2. Top [$k_2$] data assets with the lowest KLD value for the given query; and
3. Top [$k_3$] data assets with TF-IDF vectors having the lowest cosine distance from the TF-IDF vector of the given query.

$[k_1, k_2, k_3]$ can be adjusted to meet one or more considerations, such as complexity/time considerations (number of total results returned), importance weights for each model per accuracy or any other user preference.

In addition, the results asset graph construction process 600 optionally enriches the graph to make sure the subset of results chosen cover all relevant results. The graph is optionally enriched by examining, for example, one or two additional layers of neighbors per each node based on the asset graph 500 (e.g., assets with a foreign key relation to the results nodes) as well as hidden connections revealed by applying item-item collaborative filtering algorithms, as discussed below.

Figure 7:
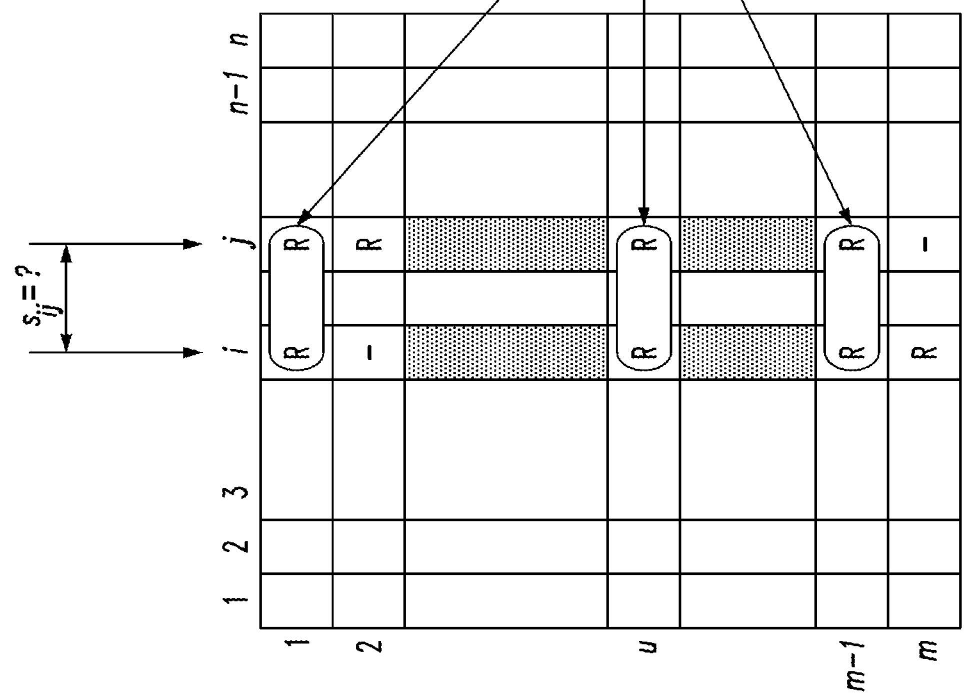
FIG. 7 illustrates an exemplary item-to-item collaborative filter, according to an embodiment of the disclosure.

As shown in FIG. 6, the exemplary results asset graph construction process 600 performs an item-item collaborative filtering graph enrichment 700, as discussed further below in conjunction with FIG. 7, during step 620.

Collaborative Filtering (CF)

Web search engines often excel in providing meaningful and satisfying results by adding, when possible, a layer of personalization to help extract and order the search results in a manner that is predicted to have the best fit for the user intent. One or more aspects of the disclosure recognize that applying personalization techniques to the search of BDL data assets can be beneficial for the same reasons (e.g., improving the user experience and the relevance of the results to the specific queries).

In one or more embodiments, user interactions with data assets are monitored to allow a maintenance of a user profile that will record the user activities. In parallel, interactions between any user and a specific data asset are monitored to allow a maintenance of an asset profile that will record these interactions. From a technical point of view, these interactions are already being captured by existing search methods but are not kept and analyzed.

The above profiles will be utilized herein in two different parts of the disclosed BDL search engine 100. First, in the enrichment component, during step 620 of FIG. 6, an item-to-item collaborative filtering is performed to allow an enrichment of the asset graph 500, in addition to the foreign keys edges. Second, a user-to-item collaborative filtering is performed that will provide an additional tool for search results ordering by relevance, discussed below.

A. Collaborative Filtering—Algorithmic Overview

Collaborative filtering, also referred as social filtering, filters information by using the recommendations of other people. Collaborative filtering is based on the idea that people who agreed in their evaluation of certain items in the past are likely to agree again in the future. A person who wants to see a movie, for example, might ask for recommendations from friends. The recommendations of some friends who have similar interests are trusted more than recommendations from others. This information is used in deciding which movie to see.

Most collaborative filtering systems apply the so-called neighborhood-based technique. In the neighborhood-based approach, a number of users are selected based on their similarity to the active user. A prediction for the active user is made by calculating a weighted average of the ratings of the selected users.

The following formulas are often used to compute the collaborative filtering value of a user and an item or two items:

$v_{i,j}$=vote of user i on item j;

$I_i$=items for which user i has voted;

Mean vote for i is expressed as follows:

$$v_i = \frac{1}{|I_i|}\sum_{j \in I_j} v_{i,j};$$

Predicted vote for "active user" a is a weighted sum, as follows:

$$p_{\alpha,j} = \overline{v}_\alpha + \kappa\sum_{i=1}^{n} w(\alpha, i)(v_{i,j} - \overline{v}_i),$$

where κ is a normalizer value and w(a,i) are weights of n similar users.

The Pearson Correlation formula is expressed as follows:

$$w(\alpha, i) = \frac{\sum_j (v_{\alpha,j} - \overline{v}_\alpha)(v_{i,j} - \overline{v}_i)}{\sqrt{\sum_j (v_{\alpha,j} - \overline{v}_\alpha)^2 (v_{i,j} - \overline{v}_i)^2}}.$$

The Cosine Correlation formula is expressed as follows:

$$w(\alpha, i) = \sum_j \frac{v_{\alpha,j}}{\sqrt{\sum_{k \in I_\alpha} v_{\alpha,k}^2}} \frac{v_{i,j}}{\sqrt{\sum_{k \in I_i} v_{i,k}^2}}$$

A. Applying Collaborative Filtering in BDL Setting

The data assets are referred to as the items herein, and users with access privileges to the BDL are referred to as the users. In the BDL context, the values ("user ratings") are handled in the CF matrix, as follows.

For that, define the "interaction grade" between a user and an item or between two different items as the number of the interactions between them. To project the different values into a finite and limited discrete values set, scale the values into the new scale with respect to the median number of user-item interactions across all users and assets in the system.

B. Item-to-Item Collaborative Filtering Model for Graph Enrichment

As noted above, the exemplary results asset graph construction process 600 performs an item-item collaborative filtering graph enrichment 700 during step 620. FIG. 7 illustrates an exemplary item-to-item collaborative filter 700, according to an embodiment of the disclosure. FIG. 7 illustrates items 1 through n in each column, and users 1 through m in each row.

In the exemplary item-to-item collaborative filter 700, similarity values between data assets are measured by observing all of the users who have interacted with both items. As shown in FIG. 7, the similarity between two assets i and j is dependent upon the 'interaction grade' given to the assets (tables) with respect to users who have rated both of items with a rating of R. Items i and j have both received ratings from users 1, u and m-1.

This approach can be utilized to further enrich the asset graph 500, which is built based on the search results and the foreign keys connections between them. The exemplary item-item collaborative filtering graph enrichment 700 is a complementary approach to the foreign key edges, that is motivated by the fact it reveals hidden and yet relevant relations between edges.

The exemplary item-to-item collaborative filter 700 adds data assets to the potential search results that has an interaction pattern similar to the way the pattern of an asset included in the search results. While the meta-model takes into account, e.g., the search text, asset topic and similar users, and the foreign keys enrich the results with the plain, pre-configured relations, between assets, the item-to-item collaborative filter 700 attempts to find assets with less-trivial potential relation to the results assets.

For example, consider a data analyst who works on an analysis of an enterprise servers' maintenance and productivity. This analyst will begin by looking at the install base tables to see the set of installed servers, he or she may also look at relevant tickets that were opened and the reported maintenance events. These assets will probably be related in foreign keys and will be found by the search model due to their relevance to the query. However, it turned out that Subject Matter Experts (SME) that monitor server faults regularly have found a correlation between server faults and the backup machine installed in the data center. This knowledge, which exists in the organization and yet, most probably will not propagate across the organization and beyond the limited scope of the SME business unit. However, the fact that an analysis is performed many times by the same user (an SME) on the tables related to the servers and on the table related to the backup machines will result in a high item-to-item collaborative filter 700 value which in turn, using the disclosed enrichment processes, will result in an edge connecting the tables. In this manner, the search results will also include the backup related assets, which may have otherwise never been recognized as relevant.

Technically, the user will set a reasonable threshold before running the enrichment process. The BDL search engine 100 will iterate over all of the search results extracted by the search engine 135. Using the maintained asset profiles, the item-item CF value is computed for each of them against all of the other assets in the system. Assets that will be found to have a mutual CF value higher or equal to the configured threshold will be connected to the asset graph 500 with an edge.

Results Ordering Engine

As noted above, the results ordering engine 160 processes the output of the preprocessor 400 and the results asset graph construction block process 600. As shown in FIG. 1, the results ordering engine 160 comprises the node rank algorithm ordering stage 170 and the user-item collaborative filtering stage 180.

In one or more embodiments, the results ordering engine 160 further increases the utility by ordering the returned search results based on what is perceived as the most relevant to the user query.

The exemplary results ordering engine 160 orders the results by a combined (multiplication) grade of the two algorithms: node rank algorithm ordering 170 and user-item collaborative filtering 180.

The preprocessor 400 pre-calculates the Page-Rank grade of each data asset, which generally relates to the popularity and importance of the resulted assets. The Page-Rank grade of each data asset is used to perform the node rank algorithm ordering 170.

The ranking based on the user-item collaborative filtering 180 integrates a collaborative filtering-based search engine, described in U.S. patent application Ser. No. 15/084,324, filed Mar. 29, 2016, entitled "Recommendation System for Data Assets in Federation Business Data Lake Environments," incorporated by reference herein in its entirety.

Generally, the maintained user profiles and the pre-computed interaction grades from the item-to-item collaborative filter 700 are used to run a full user-user collaborative filter algorithm over the user-by-item matrix, computing the collaborative filter value between the current user and each asset in the search results. The resulting value will then take part in the final ordering decision after combining the value with the page-rank like algorithm grade for the asset from the node rank algorithm ordering 170.

In one or more embodiments the user-item collaborative filter ordering 180 will serve other features of relevancy compared to the page-rank algorithm. While page-rank will mostly expose popularity and importance of a data asset, the collaborative filter grade will add the personal layer, analyzing the relevance of this asset to the specific user, based on interaction between this asset and users similar to the current one. It is noted that this will also help identify users from the same business unit and recommend accordingly, as it is reasonable to assume that users from the same unit will have similar interaction patterns with the BDL 110.

Illustrative Example

Consider a study done to evaluate the readiness of data of legacy storage drives for a failure predictive analytics project. In this study, a data scientist had to first locate the relevant data resources across the BDL 110 and then plan and perform data consolidation into a dataset which will contain one row per drive sample, e.g., the row should include all relevant data columns for this specific drive from all the different resources.

It turned out that the drive's data for a specific drive has been collected up to a certain point in time in "Oracle" tables and for later times on the "SAP" table. In order to discover this fact, the data scientist performed a long and exhaustive search for a relevant SME and a long investigation. Nothing in any of the tables, which are generic and thus, agnostic to the hardware type, included the word "drive." This will result in the absence of the required tables in simple search results. The data scientist may search for "serial number" but then two things will make the search potentially irrelevant to him: First, this is a very common column name where hundreds of tables and columns are expected to be returned, most of them with no relevance to the user. Second, the returned column names included subtle differences between "serial_number" to "serial_num" in two tables and between "parent" and "prnt". Yet another challenge for text based search.

For this example, observe the benefits offered by one or more embodiments of the present disclosure:

Terminology differences will be bridged by the NLP tool.

Page-Rank will observe the relative importance of these two tables which are essential to any user looking on historical data for any component in the install base and thus linked by foreign keys to many business units' internal tables.

If the "drive" key word will be searched, tables linked by foreign keys which are drive-related will likely be returned. The enrichment algorithm will use the asset graph to include at least one of the target table in the initial results. The item-item CF will note that many previous queries have interacted with both tables at once and thus will add the second table to the results set.

NLP: With dependency to the tables' description, the NLP models are likely to choose items with textual, semantical and morphological similarity to the words appearing in the query.

Page-Rank and user-item CF will order the two tables high in the results due to their general relative popularity and the potential that other analysts in the organization, who have some similarity to the current user, have interacted with these tables.

Conclusion

One or more embodiments of the disclosure provide methods and apparatus for searching through a business data lake. The foregoing applications and associated embodiments should be considered as illustrative only, and numerous other embodiments can be configured using the techniques disclosed herein, in a wide variety of different applications.

It should also be understood that the disclosed techniques for searching through a business data lake, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for searching through a business data lake may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a business data lake search engine 100, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a BDL search engine platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
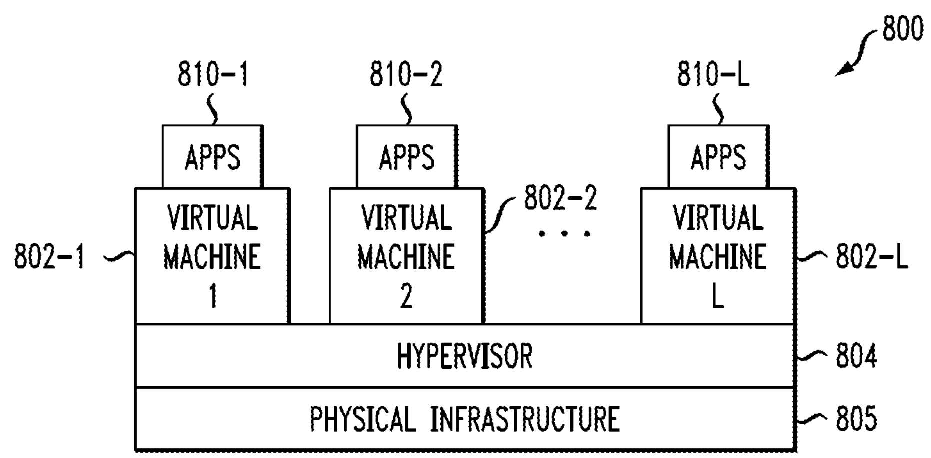
FIG. 8 illustrates an exemplary processing platform that may be used to implement at least a portion of one or more embodiments of the disclosure comprising a cloud infrastructure.

Referring now to FIG. 8, one possible processing platform that may be used to implement at least a portion of one or more embodiments of the disclosure comprises cloud infrastructure 800. The cloud infrastructure 800 in this exemplary processing platform comprises virtual machines (VMs) 802-1, 802-2, . . . 802-L implemented using a hypervisor 804. The hypervisor 804 runs on physical infrastructure 805. The cloud infrastructure 800 further comprises sets of applications 810-1, 810-2, . . . 810-L running on respective ones of the virtual machines 802-1, 802-2, . . . 802-L under the control of the hypervisor 804.

The cloud infrastructure 800 may encompass the entire given system or only portions of that given system, such as one or more of client, servers, controllers, or computing devices in the system.

Although only a single hypervisor 804 is shown in the embodiment of FIG. 8, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 804 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products.

Particular types of storage products that can be used in implementing a given storage system of the BDL search engine 100 in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed BDL search engine apparatus may each run on a computer, server, storage device or other processing platform element. A given such element may be viewed as an example of what is more generally referred to herein as a "processing device." The cloud infrastructure 800 shown in FIG. 8 may represent at least a portion of one processing platform.

Figure 9:
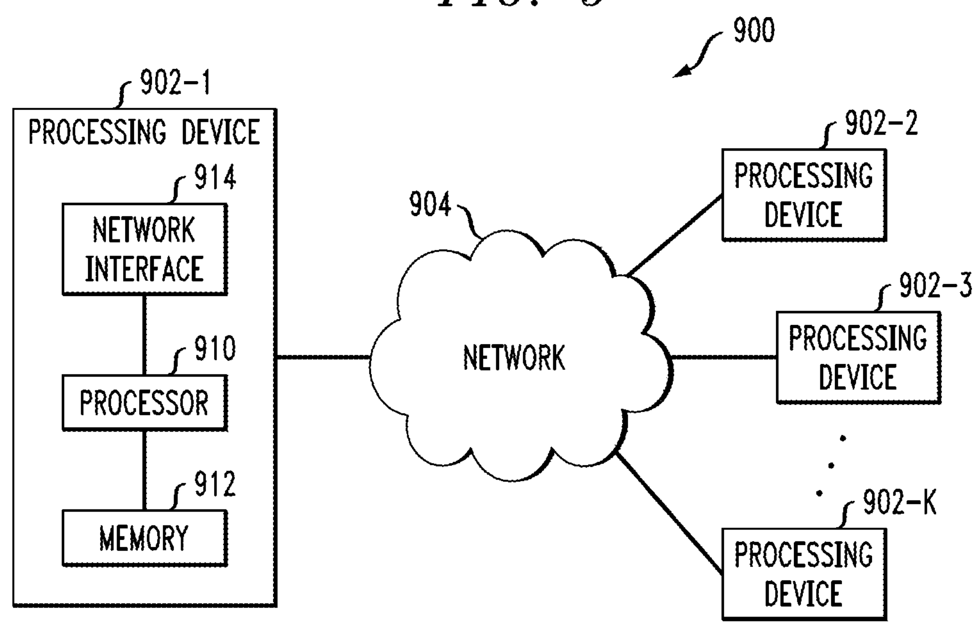
FIG. 9 illustrates another exemplary processing platform that may be used to implement at least a portion of one or more embodiments of the disclosure.

Another example of a processing platform is processing platform 900 shown in FIG. 9. The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an application specific integrated circuit (ASIC), a field programmable gate array (FPGA) or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of the flow charts and/or pseudo code shown in FIGS. 1-4 and 6 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and compute services platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:

obtaining a directed graphical structure representing a plurality of tables of a Business Data Lake, where each node in the directed graphical structure represents one of said tables and edges between the nodes represent connections established by foreign keys in the tables, wherein a foreign key in a first table identifies a row of one or more of another table and the first table;

applying a node rank algorithm to the directed graphical structure to determine a relevancy score of the tables based on a number of links to or from other tables;

in response to a query, performing the following steps:

ranking a relevancy of one or more items in the query based on a term frequency-based score to generate candidate results;

extracting a candidate sub-graph from the directed graphical structure based on one or more of the following: a top-L tables based on the term frequency-based score, and a top-M tables based on a topic model distance score for the given query and items in candidate results;

enriching the extracted candidate sub-graph by adding one or more tables not previously in the extracted candidate sub-graph using an item-to-item collaborative filter where a similarity value between two tables is measured based on a number of interactions with the two tables by a plurality of users of the Business Data Lake that have interacted with the two tables; and ordering the tables in the enriched extracted candidate sub-graph based on one or more of the relevancy score generated by the node rank algorithm and a user-to-item collaborative filter that evaluates past interactions of the users with prior search results.

2. The method of claim 1, wherein the extracting the candidate sub-graph from the directed graphical structure is further based on a top-N tables having a term frequency-inverse document frequency (TF-IDF) vector having a lowest cosine distance from the term frequency-inverse document frequency (TF-IDF) vector of the given query.

3. The method of claim 1, wherein the enriching the extracted candidate sub-graph by adding one or more tables not previously in the extracted candidate sub-graph further comprises adding a predefined number of additional layers of neighbor nodes in the directed graphical structure based on a foreign key relation to one or more nodes in the extracted candidate sub-graph.

4. The method of claim 1, wherein the relevancy of the one or more items in the query based on an Okapi score and the topic model distance score for the given query and items in the candidate results comprises a Kullback-Leibler divergence (KLD) distance.

5. The method of claim 1, further comprising the step of extracting the foreign keys and additional inetadata from the tables to model relationships between the tables.

6. The method of claim 1, further comprising the steps of indexing past user queries and creating one or more of user profiles and table profiles related to one or more of said past user queries and user interactions with the tables.

7. The method of claim 1, wherein the step of enriching the extracted candidate sub-graph by adding one or more tables not previously in the extracted candidate sub-graph further comprises adding one or more tables to the extracted candidate sub-graph based on an item-to-item collaborative filter value between each table in the extracted candidate sub-graph and additional tables in the Business Data Lake that exceeds a predefined threshold.

8. The method of claim 1, wherein the node rank algorithm identifies one or more of popular and important tables.

9. A system, comprising:

a memory; and at least one processing device, coupled to the memory, operative to implement the following steps:

obtaining a directed graphical structure representing a plurality of tables of a Business Data Lake, where each node in the directed graphical structure represents one of said tables and edges between the nodes represent connections established by foreign keys in the tables, wherein a foreign key in a first table identifies a row of one or more of another table and the first table;

applying a node rank algorithm to the directed graphical structure to determine a relevancy score of the tables based on a number of links to or from other tables;

in response to a query, performing the following steps:

ranking a relevancy of one or more items in the query based on a term frequency-based score to generate candidate results;

extracting a candidate sub-graph from the directed graphical structure based on one or more of the following: a top-L tables based on the term frequency-based score, and a top-M tables based on a topic model distance score for the given query and items in candidate results;

enriching the extracted candidate sub-graph by adding one or more tables not previously in the extracted candidate sub-graph using an item-to-item collaborative filter where a similarity value between two tables is measured based on a number of interactions with the two tables by a plurality of users of the Business Data Lake that have interacted with the two tables; and ordering the tables in the enriched extracted candidate sub-graph based on one or more of the relevancy score generated by the node rank algorithm and a user-to-item collaborative filter that evaluates past interactions of the users with prior search results.

10. The system of claim 9, wherein the extracting the candidate sub-graph from the directed graphical structure is further based on a top-N tables having a term frequency-inverse document frequency (TF-IDF) vector having a lowest cosine distance from the term frequency-inverse document frequency (TF-IDF) vector of the given query.

11. The system of claim 9, wherein the enriching the extracted candidate sub-graph by adding one or more tables not previously in the extracted candidate sub-graph further comprises adding a predefined number of additional layers of neighbor nodes in the directed graphical structure based on a foreign key relation to one or more nodes in the extracted candidate sub-graph.

12. The system of claim 9, wherein the relevancy of the one or more items in the query based on an Okapi score and the topic model distance score for the given query and items in the candidate results comprises a Kullback-Leibler divergence (KLD) distance.

13. The system of claim 9, further comprising the step of extracting the foreign keys and additional metadata from the tables to model relationships between the tables.

14. The system of claim 9, further comprising the steps of indexing past user queries and creating one or more of user profiles and table profiles related to one or more of said past user queries and user interactions with the tables.

15. The system of claim 9, wherein the step of enriching the extracted candidate sub-graph by adding one or more tables not previously in the extracted candidate sub-graph further comprises adding one or more tables to the extracted candidate sub-graph based on an item-to-item collaborative filter value between each table in the extracted candidate sub-graph and additional tables in the Business Data Lake that exceeds a predefined threshold.

16. The system of claim 9, wherein the node rank algorithm identifies one or more of popular and important tables.

17. A computer program product, comprising a tangible machine-readable storage medium having encoded therein executable code of one or more software programs, wherein the one or more software programs when executed by at least one processing device perform the following steps:

obtaining a directed graphical structure representing a plurality of tables of a Business Data Lake, where each node in the directed graphical structure represents one of said tables and edges between the nodes represent connections established by foreign keys in the tables, wherein a foreign key in a first table identifies a row of one or more of another table and the first table;

applying a node rank algorithm to the directed graphical structure to determine a relevancy score of the tables based on a number of links to or from other tables;

in response to a query, performing the following steps:

ranking a relevancy of one or more items in the query based on a term frequency-based score to generate candidate results;

extracting a candidate sub-graph from the directed graphical structure based on one or more of the following: a top-L tables based on the term frequency-based score, and a top-M tables based on a topic model distance score for the given query and items in candidate results;

enriching the extracted candidate sub-graph by adding one or more tables not previously in the extracted candidate sub-graph using an item-to-item collaborative filter where a similarity value between two tables is measured based on a number of interactions with the two tables by a plurality of users of the Business Data Lake that have interacted with the two tables; and ordering the tables in the enriched extracted candidate sub-graph based on one or more of the relevancy score generated by the node rank algorithm and a user-to-item collaborative filter that evaluates past interactions of the users with prior search results.

18. The computer program product of claim 17, wherein the enriching the extracted candidate sub-graph by adding one or more tables not previously in the extracted candidate sub-graph further comprises adding a predefined number of additional layers of neighbor nodes in the directed graphical structure based on a foreign key relation to one or more nodes in the extracted candidate sub-graph.

19. The computer program product of claim 17, further comprising the steps of indexing past user queries and creating one or more of user profiles and table profiles related to one or more of said past user queries and user interactions with the tables.

20. The computer program product of claim 17, wherein the step of enriching the extracted candidate sub-graph by adding One or more tables not previously in the extracted candidate sub-graph further comprises adding one or more tables to the extracted candidate sub-graph based on an item-to-item collaborative filter value between each table in the extracted candidate sub-graph and additional tables in the Business Data Lake that exceeds a predefined threshold.

* * * * *

UNITED STATES PATENT AND TRADEMARK OFFICE

CERTIFICATE OF CORRECTION

PATENT NO. : 10,795,895 B1
APPLICATION NO. : 15/794387
DATED : October 6, 2020
INVENTOR(S) : Ran Taig et al.

It is certified that error appears in the above-identified patent and that said Letters Patent is hereby corrected as shown below:

In the Claims

Column 16, Line 42, Claim 10, replace "further based on a top-N tables" with -- further based on a set of top-N tables --

Column 16, Lines 54-55, Claim 12, replace "one or more items in the query based on an Okapi score and the topic model distance score" with -- one or more items in the query is based on an Okapi score and wherein the topic model distance score --

Column 17, Lines 28-30, Claim 17, replace "a top-L tables based on the term frequency-based score, and a top-M tables based on a topic" with -- a set of top-L tables based on the term frequency-based score, and a set of top-M tables based on a topic --

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*